United States Patent
Marshall et al.

(10) Patent No.: US 6,285,491 B1
(45) Date of Patent: Sep. 4, 2001

(54) ADAPTIVE TEMPORAL MODULATION OF PERIODICALLY VARYING LIGHT SOURCES

(75) Inventors: Stephen W. Marshall, Richardson; Roger P. Perry, Allen; Donald B. Doherty, Richardson, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/467,816

(22) Filed: Dec. 21, 1999

Related U.S. Application Data
(60) Provisional application No. 60/114,044, filed on Dec. 28, 1998.

(51) Int. Cl.$^7$ .................................................. G02B 26/00
(52) U.S. Cl. ........................................................... 359/292
(58) Field of Search ..................... 345/148, 84; 348/743; 359/292, 291, 239

(56) References Cited

U.S. PATENT DOCUMENTS

| | | | |
|---|---|---|---|
| 5,278,652 | 1/1994 | Urbanus et al. | 358/160 |
| 5,583,688 | 12/1996 | Hornbeck | 359/291 |
| 5,969,710 | * 10/1999 | Doherty et al. | 345/148 |
| 5,986,721 | * 11/1999 | Jones, Jr. et al. | 348/743 |
| 6,201,521 | * 3/2001 | Doherty | 345/84 |

* cited by examiner

Primary Examiner—Scott J. Sugarman
Assistant Examiner—John Magee
(74) Attorney, Agent, or Firm—Charles A. Brill; Wade James Brady, III; Frederick J. Telecky, Jr.

(57) ABSTRACT

A controller (800) for a pulse width modulated display system. The controller (800) periodically determining the output of a light source by sampling the output of a light detector (808) an creating a smoothed approximation of the periodic waveform of the light source. A processor (806) in the controller (800) reads a base bit split sequence from a read only memory (804) and modifies the sequence by lengthening or shortening the bit periods described therein in order to compensate for the periodic variations of the light source. The modified bit split sequence is stored in two-port random access memory (802) where it is later accessed by both the processor (806) and a sequencer (304). The sequencer (304) reads the modified bit split sequence from the two-port random access memory (802) to determine when to load each bit of image data into a modulator an-ay. The processor (806) periodically reads the two-port random access memory (802) and further modifies the modified sequence contained therein to reflect additional waveform data collected by the detector (808).

15 Claims, 4 Drawing Sheets

ADAPTIVE TEMPORAL MODULATION OF PERIODICALLY VARYING LIGHT SOURCES

This application claims priority under 35 USC § 119(e)(1) of provisional application Ser. No. 60/114,044 filed Dec. 28, 1998.

CROSS-REFERENCE TO RELATED APPLICATIONS

The following patents and/or commonly assigned patent applications are hereby incorporated herein by reference:

| Patent No. | Filing Date | Issue Date | Title |
|---|---|---|---|
| 5,278,652 | March 23, 1993 | Jan. 11, 1994 | DMD Architecture and Timing for Use in a Pulse-Width Modulated Display System |
| 5,583,688 | Dec. 21, 1993 | Dec. 10, 1996 | Multi-Level Digital Micromirror Device |

FIELD OF THE INVENTION

This invention relates to the field of display systems, more particularly to pulse-width modulated display systems using periodically varying light sources.

BACKGROUND OF THE INVENTION

Digital display systems temporally modulate light to create images. A typical digital display system uses a digital micromirror device (DMD) to selectively reflect portions of an incident beam of light to an image plane. The DMD is an array of mirrors that are rotated in one of two directions about a torsion hinge. In the first position (on), light incident the mirror is reflected towards an image plane, typically by way of a projection lens. The light reaching the image plane forms a bright spot on the image plane representing a picture element, or pixel. When the mirror is rotated in the opposite direction to a second position (off), the light reflected by the mirror does not reach the image plane and the pixel corresponding to the mirror in the off position is dark.

Intermediate intensities are created by rapidly cycling the mirror on and off. The amount of light reflected to the image plane is a function of the duty cycle of the mirror. The human eye, or other integrator such as a photosensitive medium located at the image plane, integrates the amount of light reaching each pixel over a period of time and creates the impression of an intermediate pixel brightness. Color images are formed by superimposing three simultaneously or sequentially-generated single-color images.

Although the duty cycle of the mirror controls the time during which light is reflected to the image plane, other factors may upset the relationship between pixel intensity and duty cycle. What is needed is a more efficient method of controlling pixel intensity in pulse-width modulated display systems.

SUMMARY OF THE INVENTION

Objects and advantages will be obvious, and will in part appear hereinafter and will be accomplished by the present invention which provides a method and system for adaptive temporal modulation of a periodically varying light source. One embodiment of the claimed invention provides a method of temporally modulating a light beam. According to this embodiment, a light source is provided for sourcing a beam of light along a light path. A light modulator is provided on the light path. The light modulator comprises an array modulator elements, each modulator element operable to selectively relay light incident the modulator element to an image plane in response to an image signal. The quantity of light provided by the light source is detected and a signal representing the light output is generated. A controller receives image data words and controls the operation of the light modulator, the controller serially provides each bit of the image data words to the light modulator for a separate time period in a frame period. The quantity of light output during the time period for each bit represents the relative weight of the bit.

According to another embodiment of the disclosed invention, display system is provided. The display system comprises a light source, a modulator array, a means for detecting the amount of light from the light source, and a controller. The controller receives image data and controls the modulator array. The image data comprises multiple bits of image data for each element in the modulator array. The controller provides bits of image data to the modulator array elements such that the total quantity of light directed by each modulator element to an image plane is proportional to the weight of the image data bit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system for controlling the intensity of a pixel in a pulse width modulated display system has been developed. The new method and system improve the accuracy of pulse width modulated display systems by adapting the duration of the pulses to account for variations in the output of the light source. Since the effective brightness of a pixel is a function of the light accumulated by the pixel, taking into account both the duration and the intensity of the light directed to the pixel provides a more accurate determination of the pixel intensity than duration alone.

Figure 1:
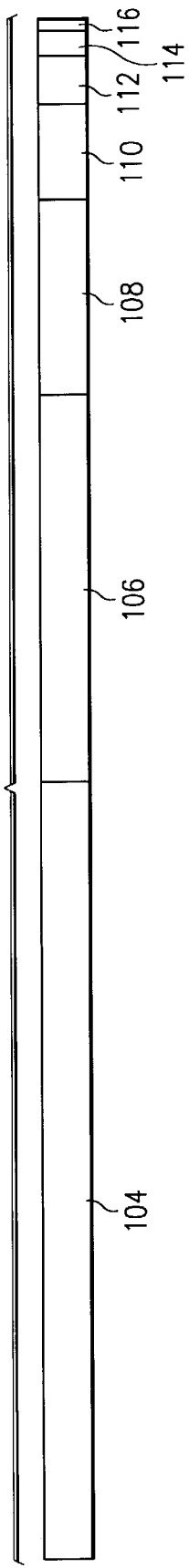
FIG. 1 is a timeline for a simple seven-bit pulse-width modulated pixel.

FIG. 1 is a timeline of a simple pulse width modulation frame period. The frame period 102 shown in FIG. 1 is divided into seven individual bit periods. During each bit period, a single data bit from a seven-bit intensity word is used to control the light modulator. The length of each bit period is proportional to the magnitude represented by the bit, or bit weight.

For example, the most significant bit (MSB) in the seven-bit binary-weighted intensity word is displayed during period 104. Bit period 104 has a duration of 64/127 of the total frame period 102. The next most significant bit has a bit period 106 equal to half of the MSB bit period 104, or 32/127 of the total frame period. Likewise, bit period 108 has a duration of 16/127 of the total frame period, bit period 110 has a duration of 8/127 of the total frame period, bit period 112 has a duration of 4/127 of the total frame period, bit period 114 has a duration of 2/127 of the total frame period, and bit period 116 has a duration of 1/127 of the total frame period. In general, the bit period for a bit is equal to $2^{n-1}/(2^m-1)$ where n is the weight of the bit and m is the total number of bits in the intensity word.

Figure 2:
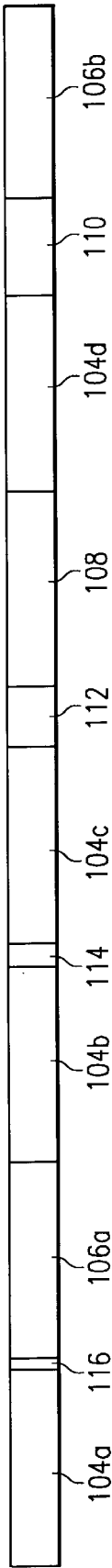
FIG. 2 is a timeline for a seven-bit pulse-width modulated pixel using bit-splitting.

The bit periods shown in FIG. 1 tend to create artifacts when showing moving images. To avoid artifacts, the longer bit periods are split into two or more bit splits and distributed throughout the frame period 102. The total duration for all of the bit splits for a given image bit equal the bit period shown in FIG. 1. FIG. 2 shows a timeline for a pulse width modulated frame period where the two most significant bit periods are split. The MSB bit period has been split into four bit splits 104a, 104b, 104c, and 104d, and the next MSB bit period has been split into two bit splits 106a and 106b. The terms bit split and bit periods are often used interchangeably.

The optimum bit sequence is determined by many factors including the data word size, the frame rate, the speed of the display device, and the time required to load the display device. Since the frame rate can vary depending on the capability of the display device to display multiple image formats and also on the ability of the image source to provide an accurate and consistent image input, several different sequences are used by each display system. These sequences are stored in a sequence read only memory (ROM) 302 shown in FIG. 3. A sequencer 304 selects a particular sequence and reads the sequence from the sequence ROM 302. The sequence indicates the order and duration for each of the bit periods or bit splits in the sequence. The sequencer 304 controls the timing of the control signals that load and reset the display device 306.

Figure 3:
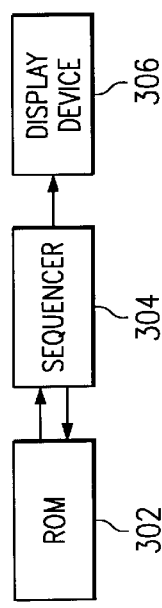
FIG. 3 is a block diagram of a portion of a pulse-width modulated display system showing a sequencer and a memory for storing bit sequences.

Although shown as separate components in FIG. 3, the three components are often combined into two, or even one physical component. Specifically, the sequencer ROM 302 and the sequencer 304 are typically two components in a much more complex application specific integrated circuit (ASIC) or gate array that processes the image data as well as controls the display device. Therefore, the statement that the sequencer ROM controls the timing of, or drives the control signals that load and reset the display device 306 comprehends the possibility that the controlling or driving is in addition to or through other parts of the circuit that may also control or drive the display device timing and control signals.

Figure 4:
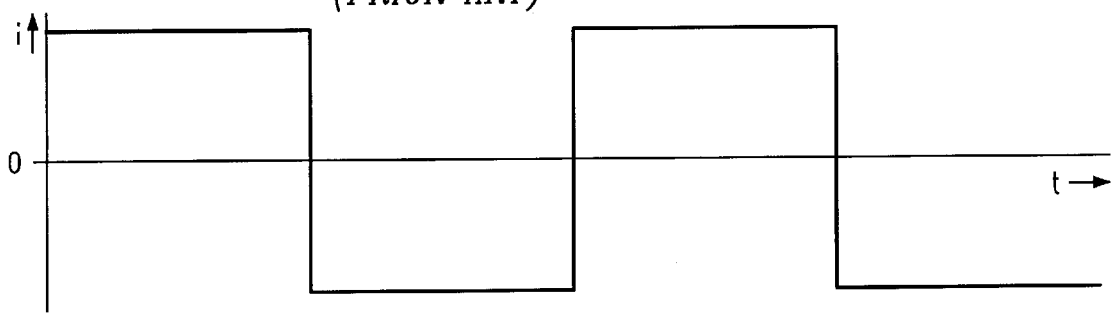
FIG. 4 is a plot of the current for an alternating current arc lamp.
Figure 5:
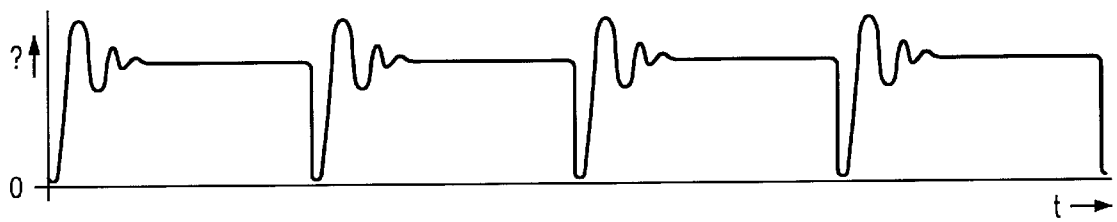
FIG. 5 is a plot of the intensity of light generated by an arc lamp receiving the current waveform shown in FIG. 4.

The pulse width modulation scheme described above is predicated on the use of a light source providing a constant level of illumination. Unfortunately, many of the light sources that are most attractive for use with common conference room projectors do not provide constant light output. For example, metal halide arc lamps drive the arc with an alternating current This current waveform, a representative of which is shown in FIG. 4, creates a non-constant light output. The output from an arc lamp dips, or ceases, each time the current polarity is switched. Additionally, the current switching causes overshoot and ringing as the new current level is reached. This ringing, which may last several hundred microseconds, results in a varying amount of light being emitted from the light source. FIG. 5 is a plot of the intensity of light emitted by an arc lamp when driven with the alternating current waveform of FIG. 4.

The effect of the ringing shown in FIG. 5 can be eliminated by hiding the transition in a spoke period in a color wheel-based display system. Alternatively, the display device is turned off during the ringing. Unfortunately, turning off the device and extending a spoke period longer than necessary, both reduce the brightness of the display system.

Figure 6:
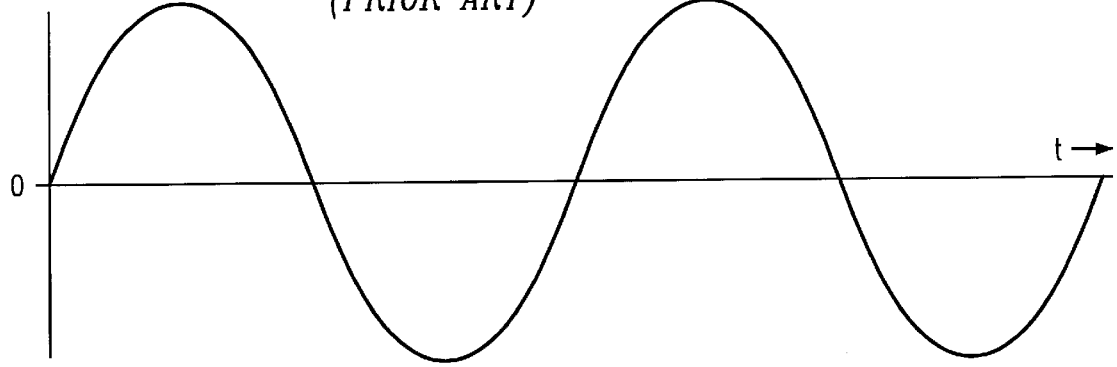
FIG. 6 is a plot of the current for an alternating current arc lamp.
Figure 7:
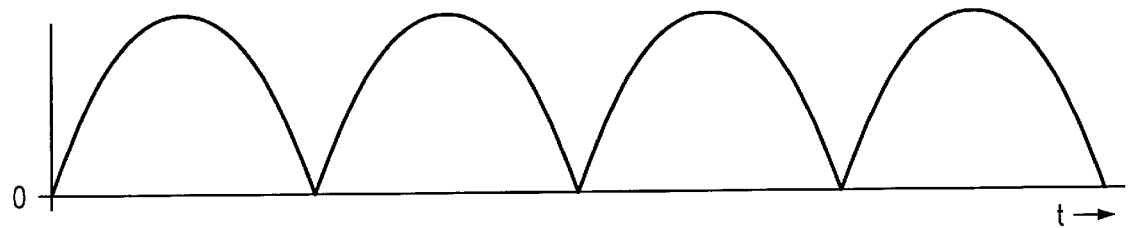
FIG. 7 is a plot of the intensity of light generated by an arc lamp receiving the current waveform shown in FIG. 6.

Other arc current waveforms create even greater difficulties. FIG. 6 is the waveform for a sinusoidal arc current. While sinusoidal waveforms are not likely to be used to drive arc lamps, the sinusoidal waveform of FIG. 6 provides a good illustration of the problems of time-varying light sources, and may approximate the waveform of a band-limited high frequency AC driver current. FIG. 7 is a plot of the intensity of light emitted by an arc lamp being driven by the alternating current of FIG. 6.

Using the bit periods shown in FIGS. 1 and 2 with a time-varying light source alters the relative weights of the image bits as displayed. For example, a data bit displayed during a peak of the waveform shown in FIG. 7 may provide much more illumination than a more significant bit displayed during a minimal-intensity period of FIG. 7. Prior art display systems could not compensate for the varying light intensity—except using the blanking periods described above—and therefore could not use light sources with less-stable outputs.

Figure 8:
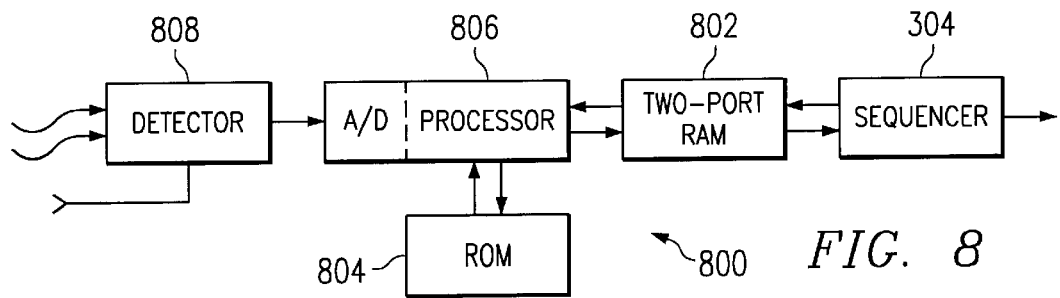
FIG. 8 is a block diagram of a portion of a pulse-width modulated display system showing a processor for modifying and storing bit sequences.

A new display system controller 800 and method has been developed that will allow the use of less-stable light output. The new display system controller 800 is shown in FIG. 8. The system controller 800 uses a two-port random access memory (RAM) 802 to store the bit period sequences used by the sequencer 304. The sequences are stored in ROM 804 and read by processor 806 which selects a sequence and stores the selected sequence in RAM 802.

System controller 800 also includes a detector 808 to sense the output of the light source. A signal representing the output intensity of the light source is driven to a processor 806 by the detector 808. The signal is typically an analog signal that is sampled by an analog-to-digital converter included in processor 806. The output of detector 808 must be sampled above the Nyquist rate to avoid aliasing. Although the light waveform can vary rapidly, especially during the current transitions, the light waveform does not have a prohibitively high bandwidth, so the period sampling is easily accomplished.

The intensity of the periodically-varying lamp output is integrated by the processor 806 to determine the total light available during each frame period. The processor then uses the sampled light waveform and the calculated total light to modify each bit period in the bit sequence. For example, bit periods during above average lamp output periods are shortened, while bit periods during below average lamp output periods are lengthened. Ideally, the duration of each bit period or bit split is equal to $(2^{n-1}/(2^m-1))*(I_{avg}/I_n)*(1/i)$:

where n is the weight of the bit, m is the total number of bits in the intensity word, $I_{avg}$ is the average intensity of the light during a frame period, $I_n$ is the intensity of light during a given bit split, and i is the number of bit splits a given bit is divided into.

Figure 9:
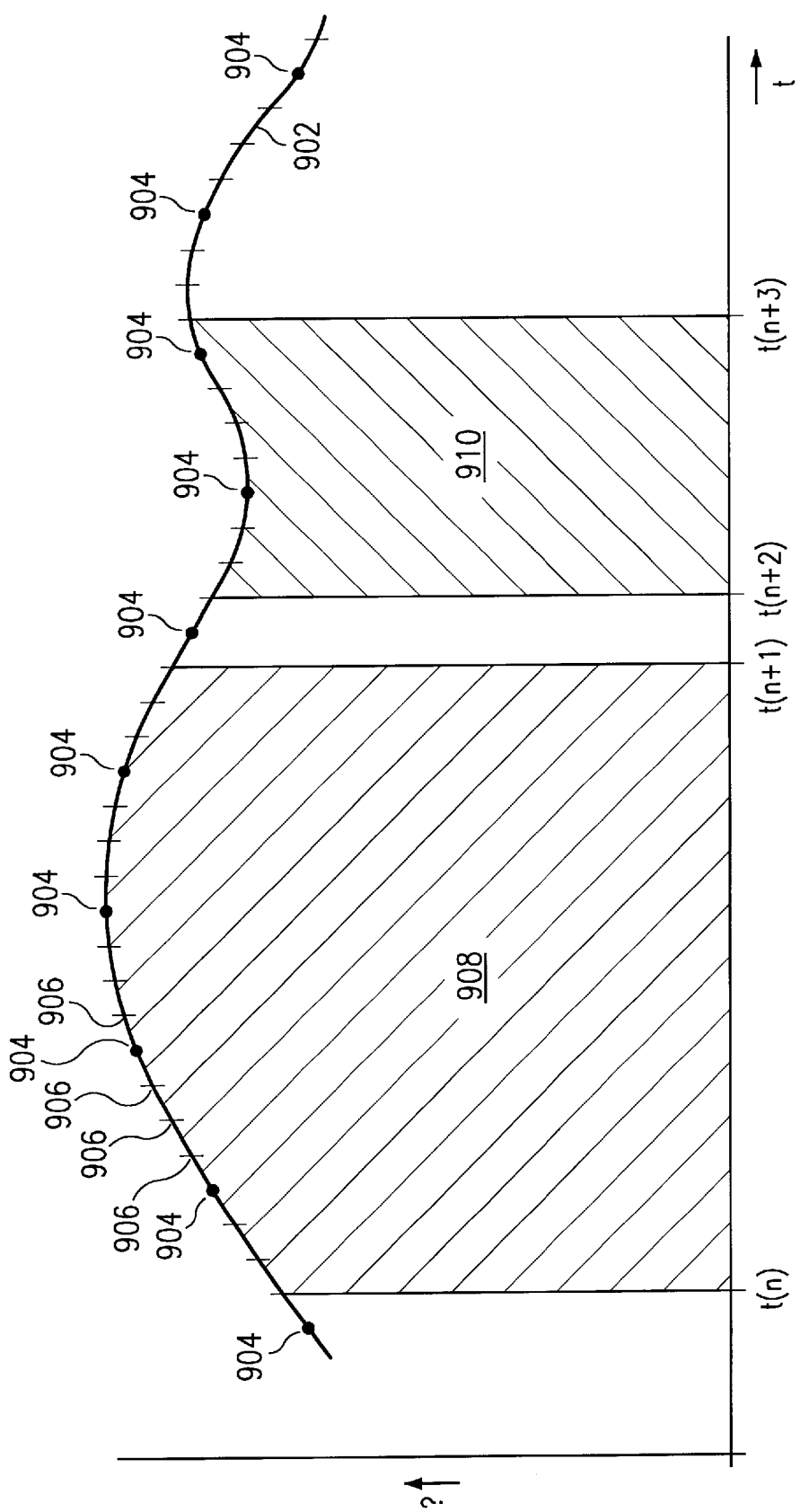
FIG. 9 is a plot of the intensity of light generated by a light source.

Arc lamps generally have a periodic waveform that varies slowly over time. If the lamp is assumed to be relatively stable from one period to the next, very little processing power is required to implement the disclosed invention. FIG. 9 shows a plot of the light intensity during a small portion of a frame period. In FIG. 9, the intensity waveform 902 is sampled at many points 904 along the waveform 902. The sampled points are accumulated over several periods to smooth the intensity waveform 902. Smoothing the waveform reduces the impact of unique excursions from the periodic waveform.

If desired, additional intensity points 906 may be calculated from the sampled data points 904. Depending on the number of samples 904, linear interpolation between the samples 904 may be sufficient to provide an accurate representation of the waveform 902.

Once the waveform of the lamp is determined, the bit periods can be altered to increase the accuracy of the pulse width modulation. In FIG. 9, a bit split, or bit period, starts at time $t(_n)$ and extends to time $t(_{n+1})$. The intensity under curve 902 is integrated by summing each sample 904 or interpolated sample 906. If the measured illumination during the bit period, represented by area 908, is a larger portion of the total frame illumination than desired, the bit sequence is modified to end the bit period before time $t(_{n+1})$.

Likewise, if the measured illumination during the bit period, represented by area 908 in FIG. 9, is a smaller portion of the total frame illumination than desired, the bit sequence is modified to extend the bit period beyond time $(t_{n+1})$. FIG. 9 also shows a second bit period having an illumination represented by the area 910, and an optional load period or blanking period between $time(_{n+1})$ and time $t(_{n+2})$.

Referring back to FIG. 8, in order to modify the bit period sequence, the processor 806 reads the current sequence from the two-port RAM 802. The processor then adds or subtracts to the duration of the bit periods in the sequence and stores the updated sequence in the two-port RAM 802.

Since a two-port RAM is ideally, but not necessarily, used to hold the updated sequences, the sequence update rate and the bit period display rates are not tightly coupled. Various embodiments of the present invention sample the lamp intensity, update the accumulated waveform data, and alter the bit period sequence at various rates. The sample, accumulation, and alter rates are independent and perform different functions. In general, a faster sample rate provides more accurate estimates of the total periodic intensity of the lamp, and more accurate estimates of the total intensity during a given bit split. The faster the accumulated intensity responds to recent data, that is the quicker older data decays, the less smoothing will occur and the quicker the system will respond to changes in the lamp waveform. The faster the bit period sequence is modified, the quicker the system will respond to changes in the lamp waveform and the more non-periodic excursions by the lamp will cause bit period errors.

The sampled periodic intensity waveform is accumulated in various ways. One embodiment provides a very fast processor to calculate a new bit sequence using only the samples from the current period and the total integrated intensity value from the previous period. On the other end of the spectrum, another embodiment uses a slow processor, or a small amount of the available processing power, to update the bit period sequence stored in the two-port RAM by the minimum possible increment each lamp period. While either extreme will work well in the proper circumstances, it is envisioned that the samples from each new lamp period will contribute between 1% and 10% of the total accumulated waveform data.

The sample, accumulate, and update rates need not be constant. According to one embodiment the default bit period sequence is changed rapidly upon system powerup in order to allow the system to quickly adapt to the lamp characteristics. After the sequence has been modified, the rate of change is limited to add stability to the system and reduce the processing required by the intensity tracking and bit period adjustment functions. Alternatively, some lamps may exhibit unstable waveforms during a powerup and warmup period. In this case the processor is allowed to modify the bit period sequence rapidly during the powerup and warmup period. Once the lamp stabilizes the modification rate can be decreased.

Thus far the description of the display system has assumed, as shown in FIGS. 1 and 2, that the frame period was equal to the time required to display each image bit in a single data word. While this simplistic approach illustrates the operation of the invention, it is not accurate when applied to sequential color systems. Sequential color systems divide the frame period into three primary color frame periods and form a complete single-color image during each of the three sub-periods. Assuming the lamp period is equal to the primary color period, the system functions as described above.

When the lamp period is not equal to the primary color period, for example when the lamp period is equal to the frame period, or three times the primary color period, the operation of the system described above must be modified to accommodate the light variations within the frame period.

Some display systems use light sources that are switched to provide varying colors of light. For example, three primary color light sources, such as lasers or light emitting diodes, may be individually enabled to sequentially provide primary color light. When the duration of each color of light can be controlled, the processor can use the techniques taught herein to alter each color period to equalize the actual amount of light provided by the light source, or light sources, during each of the three primary color periods. When the duration of the individual primary color light periods cannot be altered, however, as is the case when a spinning color wheel or drum is used to filter a white light source, variations in the output of the lamp are likely to cause unequal amounts of light during each primary color period.

The processor can respond to unequal amounts of primary colored light. The processor may simply ignore the fact that the primaries are unbalanced and use the techniques taught herein solely to balance the relative bit-weights within each primary color. Alternatively, the processor uses the light available during one primary color period as a reference when dividing all three primary color periods into bit periods. If the primary color period having a minimum total intensity is used as the reference, image brightness will be decreased, while color accuracy will be improved. Image brightness is decreased because the additional light available during the two brightest primary color periods will not be used. Color accuracy will increase because the image light provided by each image bit will accurately represent the weight of the image bit not only within each primary color, but also between primary colors.

Figure 10:
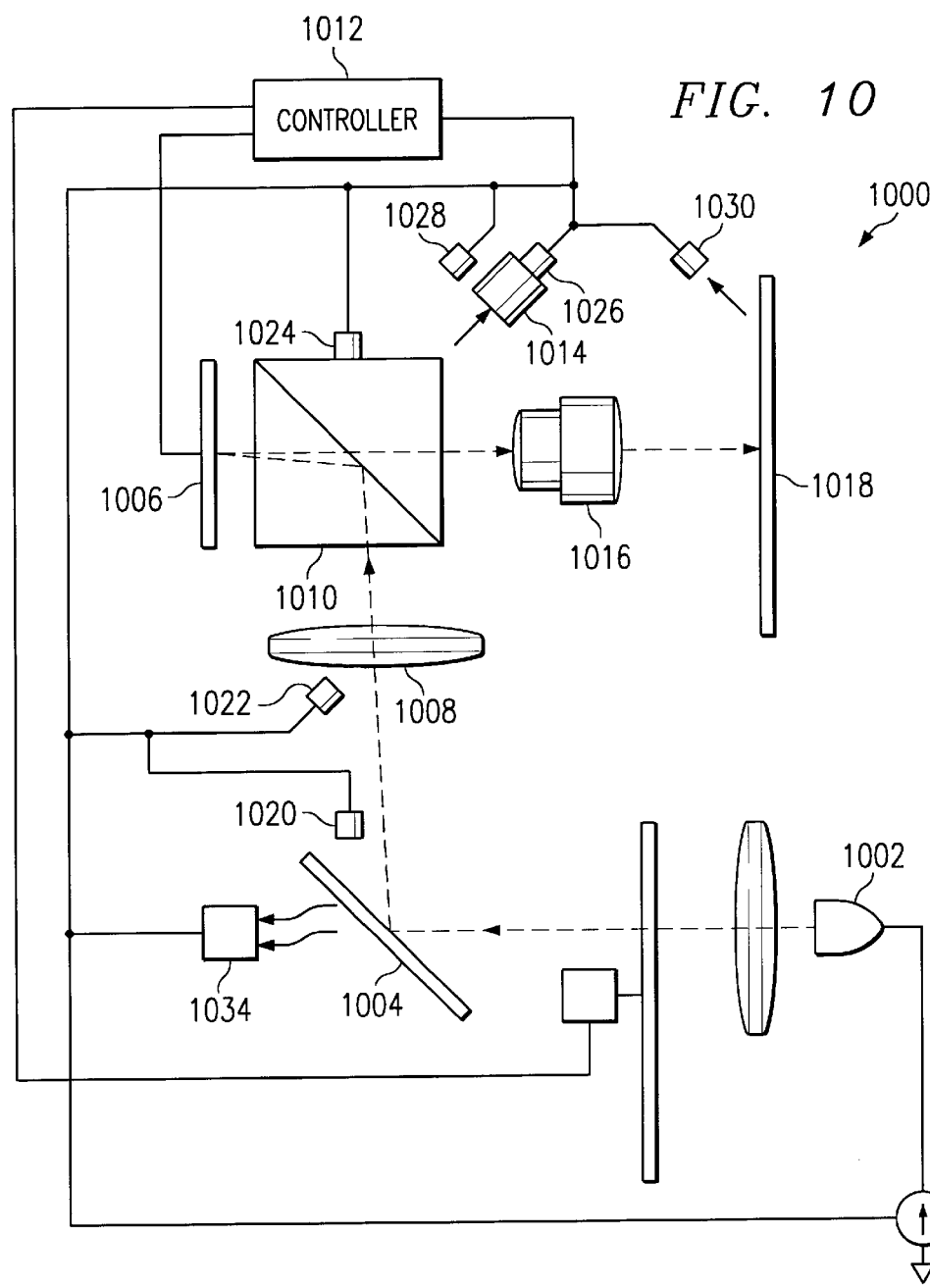
FIG. 10 is a schematic view of a micromirror-based projection system utilizing the adaptive temporal modulation techniques taught herein.

FIG. 10 is a schematic view of one embodiment of an image projection system 1000 implementing the adaptive temporal modulation of a periodically varying light source methods taught herein. In FIG. 10, light from light source 1002 is reflected by a cold mirror 1004 and focused on a micromirror device 1006 by lens 1008. Although shown as a single lens, lens 1008 is typically a group of lenses and mirrors which together focus and direct light from the light source 1002 through a prism assembly 1010 and onto the surface of the micromirror device 1006. Image data and control signals from controller 1012 cause some mirrors to rotate to an on position and others to rotate to an off position. Mirrors on the micromirror device that are rotated to an off position reflect light to a light trap 1014 while mirrors rotated to an on position reflect light to projection lens 1016. Projection lens 1016 focuses the light modulated by the micromirror device 1006 onto an image plane or screen 1018.

Also shown in FIG. 10 are many light detectors for providing an indication of the intensity of the light source to the controller as shown in FIG. 8. Although many light detectors are shown in FIG. 10, generally only one detector is necessary or desired. The type and location of the detector depends on the individual system design. For example, a photodetector or other light detector 1020 is placed in the illumination path of the projector and intercepts a portion of the light headed to the light modulator 1006. Alternatively, light detector 1022 is used to detect the light reflected by one of the transmissive elements in the optical path. The advantage of using light detector 1022 is that the light it captures is from a ghost reflection and therefore does not reduce the light available to the light modulator 1006. Many other alternative light detector locations are available. For example, light detector 1024 monitors light passing through the illumination prism assembly 1010. Light detector 1026 measures the light entering the light trap 1014. Light detector 1026 measures the light scattered in the projector housing. Light detector 1030 measures the light reflected by the image screen 1018.

If the light detector is not in the illumination path of the projector, that is if the detector is not between the light source 1002 and the light modulator 1006, the signal from the light detector may not directly represent the amount of light output by the lamp source 1002. For example, the light reaching a detector 1026 in the light trap 1014 is primarily a function of the image data provided to the modulator 1006, not merely the output of the light source 1002. Over time, however, a processor could determine the periodic output of the light source 1002 by measuring the light outside the illumination path and accounting for the influence of image data on the collected light.

Since measuring the intensity of light in the illumination path reduces the light available to the modulator 1006, and measuring the light outside the illumination path requires a lot of processing power to compute the output of the light source, a better alternative is to measure a proxy for the light intensity.

Perhaps the best proxy for the intensity of the light provided to the light modulator 1006 by the light source 1002 is the current supplied to the light source 1002. Since the output of the light source 1002 closely tracks the input current, the system controller 1012 can simply monitor the current output of the lamp power supply 1032.

A second proxy for the visible light reaching the modulator 1006 is the infrared light passing through the cold mirror 1004. While not all systems use cold mirrors, those that do use cold mirrors can position an infrared detector 1034 behind the cold mirror to measure the infrared light passing through the cold mirror 1004. As long as the amount of infrared light provided by the light source 1002 track the amount of visible light, the output of the infrared detector is a good proxy for the visible light output.

Thus, although there has been disclosed to this point a particular embodiment for an adaptive temporal modulation method and system for use with periodically varying light sources, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of temporally modulating a light beam, said method comprising:

providing a light source, said light source for providing a beam of light along a light path;

providing a light modulator on said light path, said light modulator comprising an array modulator elements, each modulator element operable to selectively relay light incident said modulator element to an image plane in response to an image signal;

detecting the quantity of light provided by said light source and providing a signal representing said light output; and providing a controller for receiving image data words and controlling the operation of said light modulator, said controller serially providing each bit of said image data words to said light modulator for a separate time period in a frame period, wherein the quantity of light output during the time period for each bit represents the relative weight of said each bit in said image data word.

2. The method of claim 1, said step of detecting comprising a photodetector in said light path.

3. The method of claim 1, said step of detecting comprising a current detector for measuring the current supplied to said light source.

4. The method of claim 1, said step of detecting comprising a photodetector detecting reflected light.

5. A display system comprising:

a light source for providing a periodically varying beam of light along a light path;

a modulator array in said light path;

a means for detecting the amount of light provided to said modulator array by said light source; and a controller electrically connected to said modulator array, said controller operable to receive image data and to control said modulator array, said image data comprising multiple bits of image data for each element in said modulator array, said controller providing said bits of image data to said modulator array elements such that the total quantity of light directed by each modulator element to an image plane is proportional to the weight of said image data bit.

6. The display system of claim 5, said controller comprising;

memory for storing at least one base bit split sequence and for storing at least one modified bit split sequence;

a processor for receiving samples representing the output of said light source and for calculating a smoothed estimate of the periodic output of said light source, said processor modifying said base bit split sequences and for storing said modified bit split sequences in memory;

a sequencer for reading said modified bit split sequence from memory and for controlling the operation of said modulator array based on said modified bit split sequence.

7. The display system of claim 6, said memory comprising a read only memory for storing said at least one base bit split sequence.

8. The display system of claim 6, said memory comprising a two port random access memory for storing said at least one modified bit split sequence.

9. The display system of claim 6, said processor flier modifying said modified bit split sequence each frame period.

10. The display system of claim 6, said periodically varying beam of light having a periodically varying intensity and further comprising:

at least two sequentially alternating primary color periods, wherein said periodically varying beam of light is a unique primary color beam of light during each said color period; and wherein at least two of said primary color beams of light have a different total intensity, said processor modifying said base bit split sequences to equalize the total quantity of light directed by each modulator element to an image plane during all said primary color periods in response to equal-weight image data bits.

11. The display system of claim 5, said controller comprising an analog to digital converter for digitizing an output from said means for detecting.

12. The display system of claim 5, said means for detecting the output of said light source comprising a current sensor.

13. The display system of claim 5, said means for detecting the output of said light source comprising a light detector.

14. The display system of claim 5, said means for detecting the output of said light source comprising a light detector in said illumination path.

15. The display system of claim 5, said periodically varying beam of light having a periodically varying intensity and further comprising:

at least two sequentially alternating primary color periods, wherein said periodically varying beam of light is a unique primary color beam of light during each said color period; and wherein at least two of said primary color beams of light have a different total intensity, said controller providing said bits of image data to said modulator array elements such that the total quantity of light directed by each modulator element to an image plane is proportional to the weight of said image data bit during all said primary color periods.

* * * * *